US009678212B2

(12) United States Patent
Scheitlin et al.

(10) Patent No.: US 9,678,212 B2
(45) Date of Patent: Jun. 13, 2017

(54) SATELLITE MEASUREMENT SCREENING TO PROTECT THE INTEGRITY OF EXISTING MONITORS IN THE PRESENCE OF AMPLITUDE SCINTILLATION

(71) Applicant: Honeywell International Inc., Morristown, NJ (US)

(72) Inventors: Joseph E. Scheitlin, Plymouth, MN (US); Mats Anders Brenner, Plymouth, MN (US); Kim A. Class, Andover, MN (US); Randy J. Reuter, Brooklyn Park, MN (US); Bruce G. Johnson, Shoreview, MN (US); John M. Howard, St. Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 562 days.

(21) Appl. No.: 14/193,759

(22) Filed: Feb. 28, 2014

(65) Prior Publication Data

US 2015/0247932 A1      Sep. 3, 2015

(51) Int. Cl.
*G01S 19/07* (2010.01)
*G01S 19/20* (2010.01)
*G01S 19/08* (2010.01)

(52) U.S. Cl.
CPC .............. *G01S 19/20* (2013.01); *G01S 19/07* (2013.01); *G01S 19/08* (2013.01)

(58) Field of Classification Search
CPC .................................. G01S 19/20; G01S 19/07
USPC .......................... 342/357.44, 357.58, 357.64
See application file for complete search history.

(56) References Cited

U.S. PATENT DOCUMENTS 6,693,979 B1     2/2004  Kumar
7,400,292 B2 *   7/2008  DiLellio ................. G01S 19/08
                                                     342/357.31
8,451,168 B2 *   5/2013  Henkel .................... G01S 19/04
                                                     342/357.44

(Continued)

FOREIGN PATENT DOCUMENTS

EP       2363730        9/2011
WO    2009125011      10/2009

OTHER PUBLICATIONS

Murphy et al,, "More Ionosphere Anomaly Mitigation Considerations for Category II/III GBAS", "Ion GNSS 20th International Technical Meeting of the Satellite Division", Sep. 25-28, 2007, pp. 438-452.*

(Continued)

*Primary Examiner* — Marcus Windrich
(74) *Attorney, Agent, or Firm* — Fogg & Powers LLC

(57) ABSTRACT

A method of implementing a real-time screening process for amplitude scintillation is presented. The method includes detecting an amplitude scintillation event during a sample time period at an amplitude scintillation monitor; excluding associated satellite measurement data from further use based on the detection of the amplitude scintillation event at the amplitude scintillation monitor; detecting an end to the amplitude scintillation event at the amplitude scintillation monitor; and readmitting associated satellite measurement data collected after the end of the amplitude scintillation event as determined by the amplitude scintillation monitor.

20 Claims, 5 Drawing Sheets

(56) References Cited

U.S. PATENT DOCUMENTS

| | | | | |
|---|---|---|---|---|
| 2004/0088111 A1* | 5/2004 | Ahlbrecht | ............ | G01S 5/0009 |
| | | | | 701/471 |
| 2010/0245168 A1* | 9/2010 | Rollet | ............ | G01S 19/21 |
| | | | | 342/357.23 |
| 2011/0215965 A1* | 9/2011 | Brenner | ............ | G01S 19/08 |
| | | | | 342/357.24 |
| 2013/0271318 A1* | 10/2013 | Doucet | ............ | G01S 19/25 |
| | | | | 342/357.64 |
| 2015/0226855 A1* | 8/2015 | Averin | ............ | G01S 19/07 |
| | | | | 342/357.44 |
| 2016/0154109 A1* | 6/2016 | Achanta | ............ | G01S 19/20 |
| | | | | 342/357.58 |

OTHER PUBLICATIONS

V. Sreeja and M. Aquino, "Impact of ionospheric scintillation on GNSS receiver tracking performance over Latin America," Ionospheric Radio Systems and Techniques (IRST 2012), 12th IET International Conference on, York, 2012, pp. 1-4.*

European Patent Office, "Extended European Search Report from EP Application No. 15155284.1 mailed Jul. 20, 2015", "from Foreign Counterpart of U.S. Appl. No. 14/193,759", Jul. 20, 2015, pp. 1-8, Published in: EP.

Murphy et al., "More Ionosphere Anomaly Mitigation Considerations for Category II/III GBAS", "Ion GNSS 20th International Technical Meeting of the Satellite Division", Sep. 25-28, 2007, pp. 438-452, Publisher: The Institute of Navigation, Published in: US.

Rodrigues et al., "Statistical Analysis of GPS Ionospheric Scintillation and Short-Time TEC Variations Over Northern Europe", "Navigation: Journal of The Institute of Navigation", Jun. 1, 2004, pp. 59-75, vol. 51, No. 1, Publisher: Institute of Engineering Surveying and Space Geodesy, The University of Nottingham, Published in: GB.

Tsujii et al., "Improvement of INS-Aided GPS Tracking Performance Under Strong Ionospheric Scintillation", "Proceedings of the 2014 International Technical Meeting of The Institute of Navigation", Jan. 27-29, 2014, pp. 638-644, Published in: US.

Beach et al., "Development and Use of a GPS Ionospheric Scintillation Monitor", "IEEE Transactions on Geoscience and Remote Sensing", May 2001, pp. 918-928, vol. 39, No. 5, Publisher: IEEE.

* cited by examiner

SATELLITE MEASUREMENT SCREENING TO PROTECT THE INTEGRITY OF EXISTING MONITORS IN THE PRESENCE OF AMPLITUDE SCINTILLATION

BACKGROUND

Ground Based Augmentation Systems (GBAS) for Global Navigation Satellite Systems (GNSS) broadcast one or more parameters that can be received by a GNSS receiver to correct for various errors in the satellite signals received. A scintillation threat occurs when ionospheric scintillation disturbances cause errors in the received satellite signals (Global Positioning System (GPS) signals). Ionospheric (iono) scintillation is a fluctuation of the GPS signal amplitude and/or phase, generated as the signal passes through localized anomalies in the total electron content (TEC) in the ionosphere. Ionospheric (iono) amplitude scintillation causes a rapid fluctuation of the GPS signal amplitude in signals passing through the ionosphere. These disturbances in the amplitude (signal strength) may affect the ability of the satellite systems Ground Based Augmentation System (GBAS) to detect out of tolerance precision approach information for an aircraft that is landing at an airport serviced by a ground station.

Since scintillation is not a rare occurrence, the ionosphere scintillation threatens satellite systems by generating "blinding" or false trip scenarios for some of the satellite fault monitors in the ground station sub-system. Additionally, ionosphere scintillation may cause an integrity monitor's underlying test statistic and its associated bounding sigma ($\sigma$) to be significantly different than expected and thereby unable to meet its required performance.

SUMMARY

The present application relates to a method of implementing a real-time screening process for amplitude scintillation. The method includes detecting an amplitude scintillation event during a sample time period at an amplitude scintillation monitor; excluding associated satellite measurement data from further use based on the detection of the amplitude scintillation event at the amplitude scintillation monitor; detecting an end to the amplitude scintillation event at the amplitude scintillation monitor; and readmitting associated satellite measurement data collected after the end of the amplitude scintillation event as determined by the amplitude scintillation monitor.

DRAWINGS

Understanding that the drawings depict only exemplary embodiments and are not therefore to be considered limiting in scope, the exemplary embodiments are described with additional specificity and detail through the use of the accompanying drawings, in which.

Figure 4:
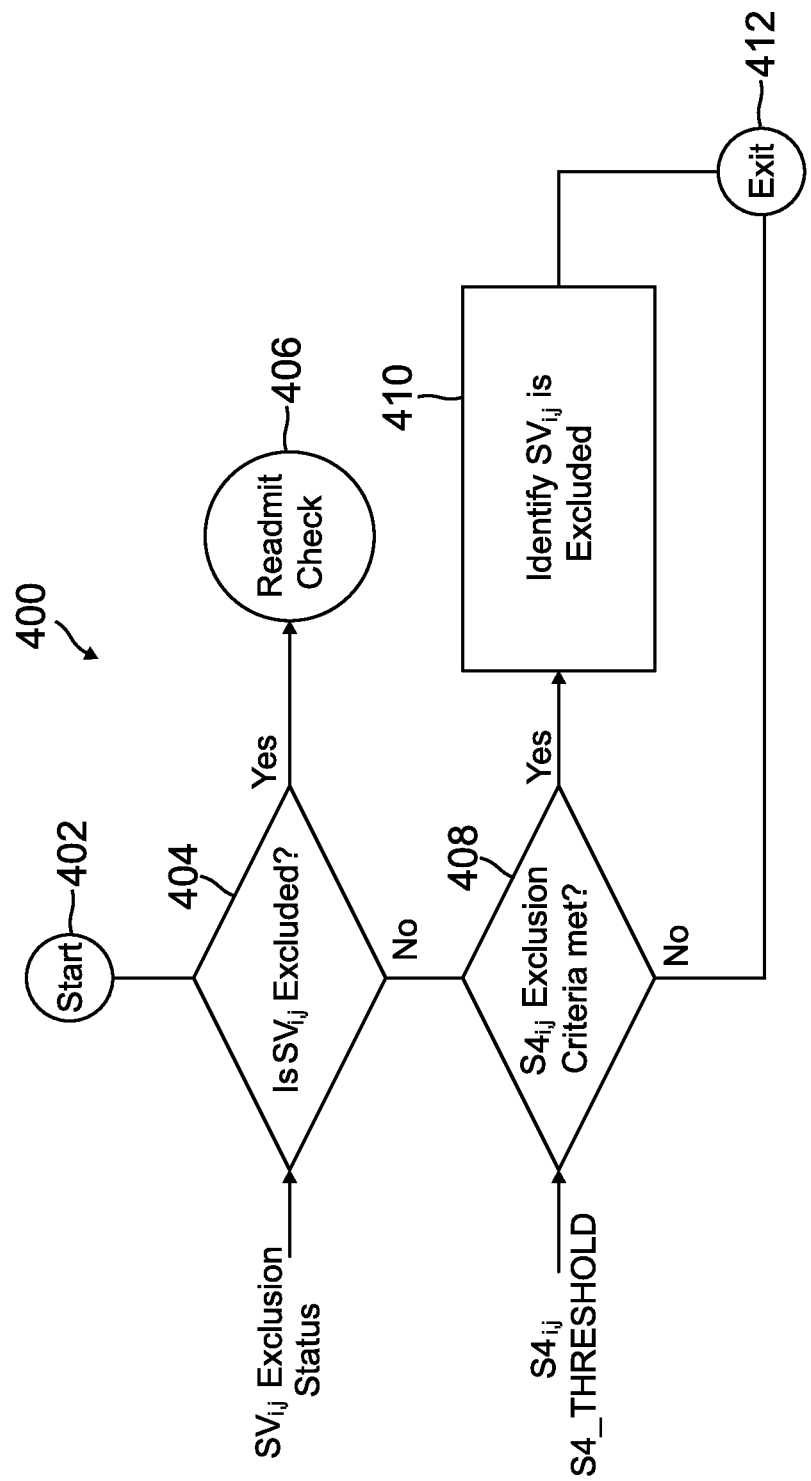
Figure 5:
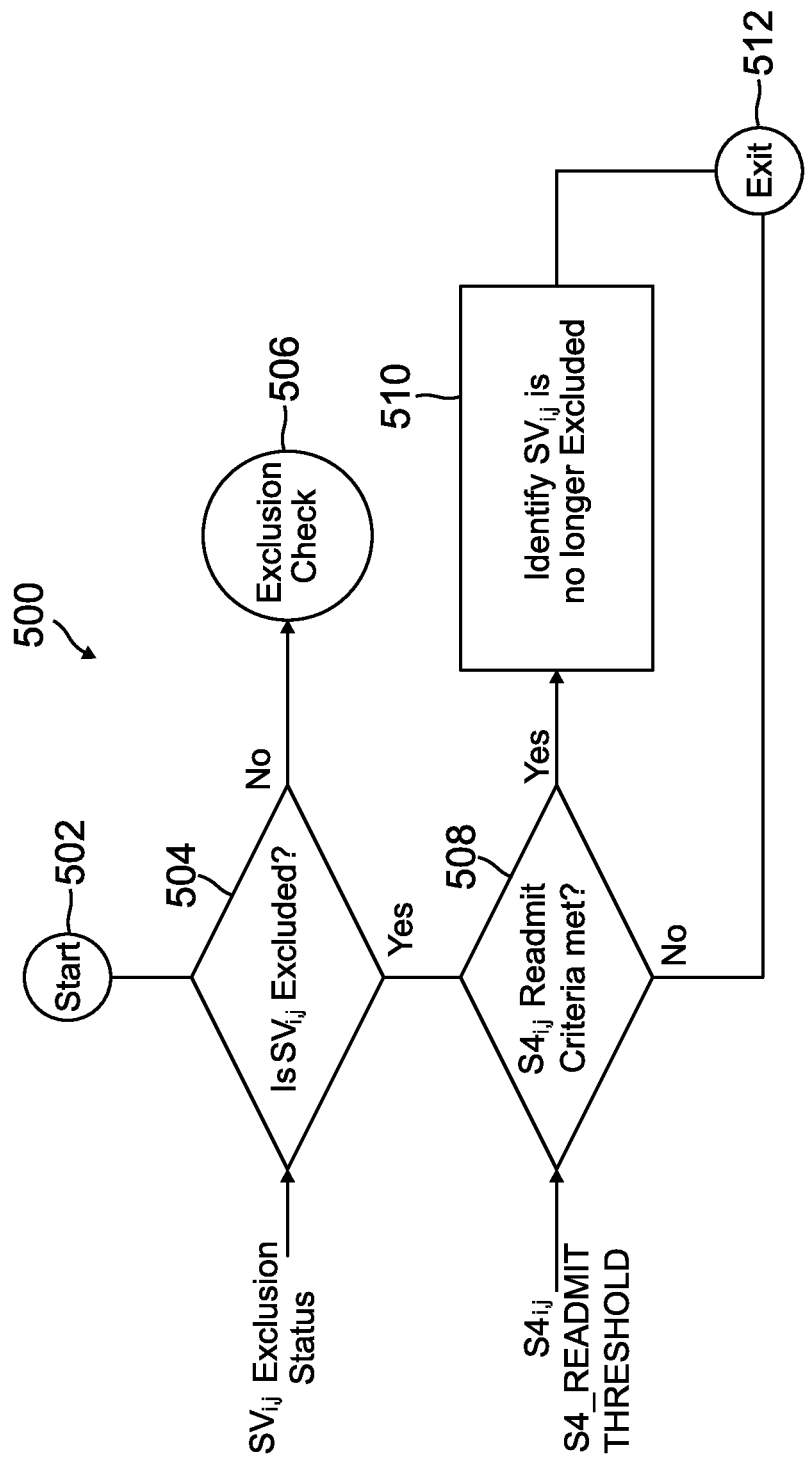

FIG. 4 shows a flow diagram of a method of excluding satellite measurement data from further use once an amplitude scintillation monitor discriminator (S4) measurement has reached an exclusion level in accordance with the present application; and FIG. 5 shows a flow diagram of a method of readmitting the use of the satellite measurement data once an amplitude scintillation monitor discriminator (S4) measurement has achieved its readmittance criteria in accordance with the present application.

In accordance with common practice, the various described features are not drawn to scale but are drawn to emphasize specific features relevant to the exemplary embodiments.

DETAILED DESCRIPTION

Ionospheric amplitude scintillation is an environmental condition which can impact the GPS satellite signal reception. In order to address the above referenced problems and to protect the satellite systems monitors, a screening process and system described herein screens out satellite measurement data that can potentially corrupt monitor operations. The screening process described herein excludes satellite measurement data obtained during a scintillation event and readmits satellite measurement data obtained after the scintillation event is determined to be over. Specifically, an amplitude (signal strength) scintillation monitor and satellite measurement data exclusion and re-admittance process to screen satellite measurement data affected by an amplitude scintillation event is described herein. This exclusion and re-admittance process ensures that the resultant GPS signals continue to protect system integrity; i.e., the existing monitors still meet their integrity requirements. This screening process is used as part of a GBAS. GBAS is used to provide precision landing services to the aviation community. The screening process detects unfavorable satellite measurement data and prohibits its use in monitors while enabling valid data to pass. The valid satellite measurement data, which is allowed to pass thru this screening process, enables the remaining functions/monitors to operate properly to insure system integrity.

The scintillation monitor described herein is designed to screen satellite measurement data for amplitude scintillation and to remove that measurement data when its use degrades the system's ability to protect integrity. The amplitude scintillation is monitored for each satellite measurement used in the GBAS. The amplitude monitor is based on the variance of the satellite's measured signal to noise ratio (SNR) power level.

Figure 1:
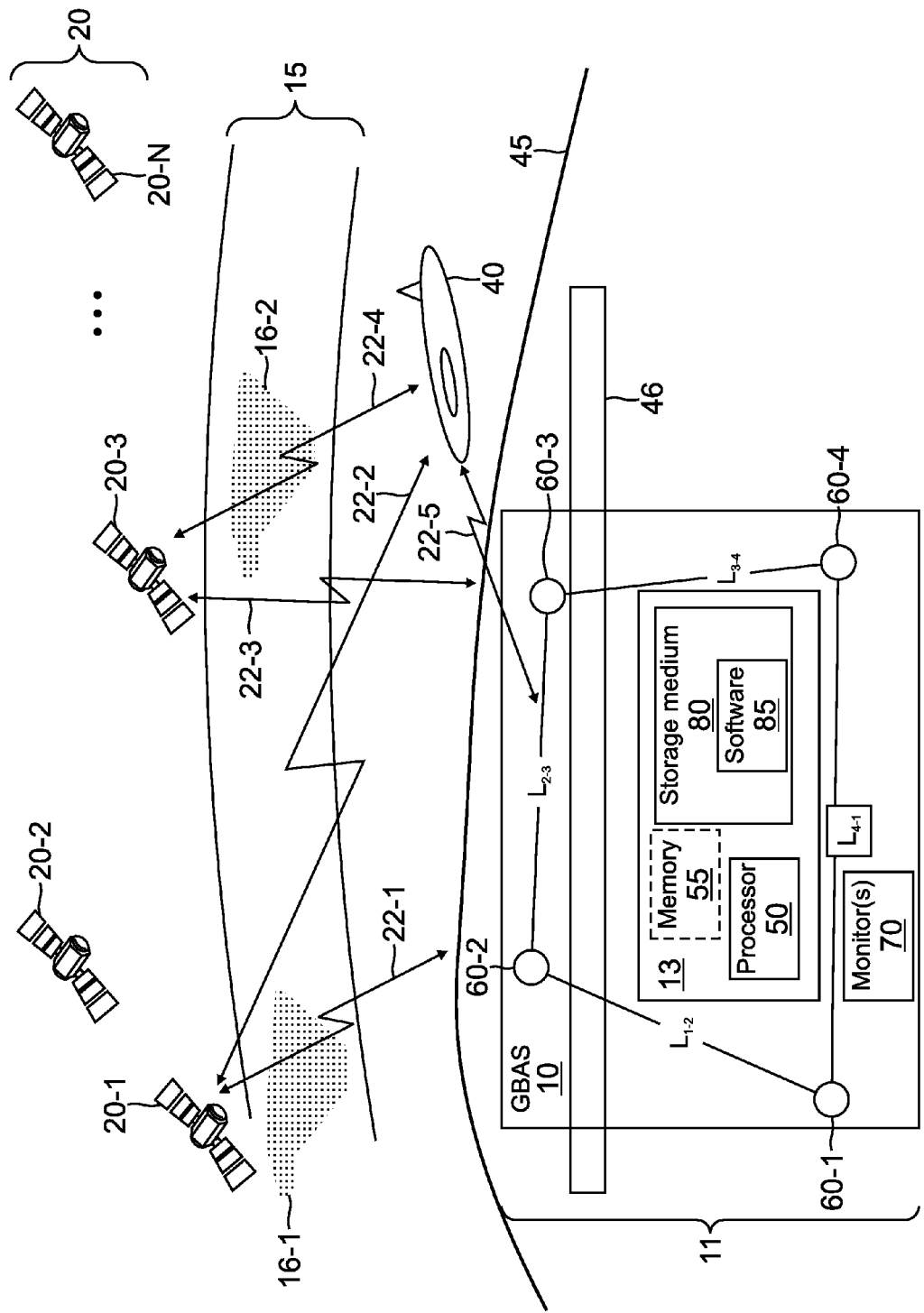
FIG. 1 shows an aircraft communicatively coupled to a satellite system and a ground based augmentation system that provides real-time screening for amplitude scintillation in accordance with the present application.

FIG. 1 shows an aircraft 40 communicatively coupled to a satellite system 20 including a plurality of satellites 20(1-N) and a communicatively coupled GBAS 10 that provides real-time screening based on amplitude scintillation in accordance with the present application. The aircraft 40 is also referred to herein as "airborne vehicle 40". The GBAS 10 utilizes the received satellite signals to augment the positional accuracy in certain applications. For example, ground-based augmentation systems can increase the accuracy in precision aircraft approach applications. The ground based augmentation system 10 is part of a ground station 11 that is associated with a runway 46 at an airport. The horizon of the earth is represented generally at 45. The ionosphere 15 is a layer of the atmosphere that is between the satellites 20(1-N) and the earth 45. As shown in FIG. 1, localized anomalies in total electron content (TEC) represented generally at 16-1 and 16-2 are in portions of the ionosphere 15. The localized anomalies in TEC 16(1-2) depict all scintillation events but herein we refer to them as "amplitude scintillation events 16(1-2)" only. The amplitude scintillation events 16(1-2) are signal-perturbing features of the ionosphere 15 that affect the signal amplitude and that change in time and are found in different portions of the ionosphere 15 at different times.

The ground based augmentation system 10 includes at least one monitor 70, a plurality of reference receivers (RRs) 60(1-4), and an amplitude scintillation monitor 13. The amplitude scintillation monitor 13 includes a processor 50, storage medium 80, software 85, and optional memory 55. The processor 50 is communicatively coupled to receive input from the plurality of satellites 20(1-N) via the plurality of reference receivers (RRs) 60(1-4). As is known to one skilled in the art, the integrity monitors 70 and the GBAS 10 also interface with a processor and have software and memory. In order to simplify the drawings, these are not shown in FIG. 1.

The first reference receiver 60-1 is a distance $L_{1\text{-}2}$ from the second reference receiver 60-2. The second reference receiver 60-2 is a distance $L_{2\text{-}3}$ from the third reference receiver 60-3. The third reference receiver 60-3 is a distance $L_{3\text{-}4}$ from the fourth reference receiver 60-4. The fourth reference receiver 60-4 is a distance $L_{4\text{-}1}$ from the first reference receiver 60-1. The distances between the reference receivers 60(1-4) are referred to herein as baselines.

The at least one monitor 70 is also referred to herein as "integrity monitors 70". As described above, amplitude scintillation can degrade the test statistics of some integrity monitors 70. This application focuses on mitigation of the impact of the amplitude scintillation threat on these monitors 70.

The scintillation threat is mitigated by implementing a real-time amplitude scintillation screening process that screens satellite measurements for undesirable levels of amplitude scintillation, thereby preventing corruption of the integrity monitors 70. The amplitude scintillation monitor discriminator is referred to herein as S4. The real-time screening process also determines when the amplitude scintillation event is over and readmits satellite measurement data collected from the previously screened measurement source. The re-admittance occurs when the amplitude scintillation monitor discriminator satisfies the re-admittance criteria, as described below.

Amplitude scintillation is estimated using an S4 value which is an industry standard. A true S4 value is found using the receiver's signal intensity or received signal power. The S4 is based on the receiver's signal-to-noise ratio, SNR. The amplitude scintillation test statistic starts with the signal-to-noise ratio from the $j^{th}$ satellite on the $i^{th}$ receiver, $SNR_{i,j}$. The signal-to-noise ratio is then converted to power, $x(i,j)$. Finally, an example of an S4 value can be calculated using the following equation, which is the square root of a normalized variance:

$$x_{i,j} = 10^{\frac{SNR_{i,j}}{10}}$$

$$S4_{i,j} = \sqrt{\frac{\frac{1}{N}\sum x_{i,j}^2 - \left(\frac{1}{N}\sum x_{i,j}\right)^2}{\left(\frac{1}{N}\sum x_{i,j}\right)^2}}$$

where $N$ = Number of samples

The amplitude scintillation monitor discriminator is computed and evaluated for all pairs of valid reference receivers and tracked satellites for which an SNR measurement is available. Every reference receiver that receives a signal from a satellite is defined to be in a reference receiver/satellite pair $RR_i/SV_j$. The terms "space vehicle" (SV) and "satellite" are used interchangeably herein. The reference receiver/satellite pair $RR_i/SV_j$ in a current sample time period is also referred to herein as $SV_{i,j}$. For example, as shown in FIG. 1, the satellite signal is received, via wireless communication link 22-1, at the second reference receiver 60-2 from the first satellite 20-1 so the second reference receiver 60-2 and the first satellite 20-1 are a reference receiver/satellite pair $RR_2/SV_1$. Of course, the same satellite signal is also received, via a wireless communication link, at the first reference receiver 60-1, if the first reference receiver 60-1 is in the reception area of the first satellite 20-1, so the first reference receiver 60-1 and the first satellite 20-1 form a reference receiver/satellite pair $RR_1/SV_1$. The reception area for a satellite is that area of the earth that is able to receive (exposed to) signals from the satellite. The reception area changes with time as the satellite orbits the earth and as the earth rotates. A reception mask may be applied to limit acceptance of these satellite signals below a certain elevation. A broadcast signal, which is sent via wireless communication link 22-5 to the aircraft 40, only includes data from those satellites that are not excluded based on the amplitude scintillation monitor discriminator 13.

Figure 2:
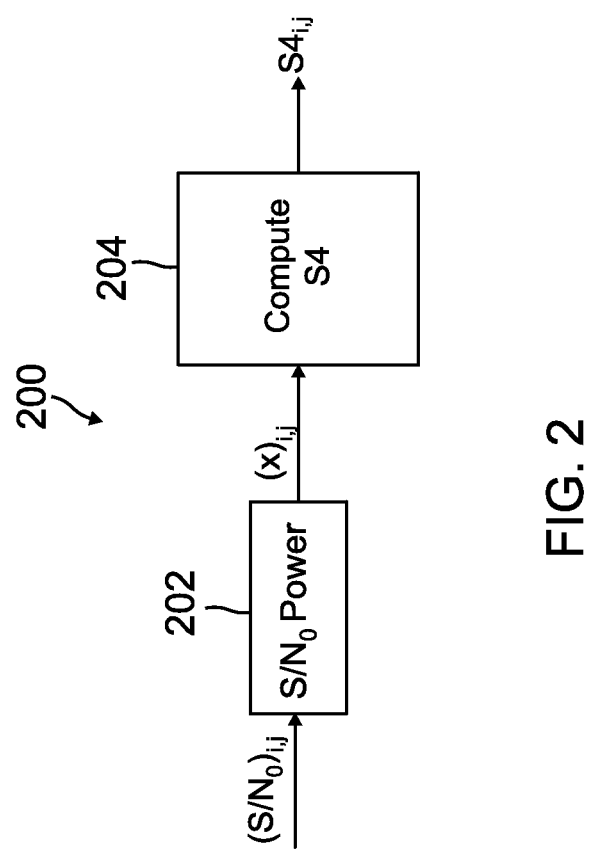
FIG. 2 shows a flow diagram of a method to compute an amplitude scintillation monitor discriminator in accordance with the present application.

FIG. 2 shows a flow diagram of a method 200 to compute an amplitude scintillation monitor discriminator (S4) in accordance with the present application. The amplitude scintillation monitor discriminator (S4) is also referred to herein as an "amplitude scintillation monitor discriminator (S4) measurement" and a "variation in an amplitude of the signal to noise power level at sample time k $(S4)_{i,j}(k)$". There is an amplitude scintillation monitor discriminator for each reference receiver/satellite pair $RR_i/SV_j$.

At block 202, the SNR power level is calculated. Each satellite's SNR power level $(x)_{i,j}$ (for satellite j on each reference receiver i) is computed for reference receiver/satellite pairs. At block 204, the amplitude scintillation monitor discriminator $(S4_{i,j})$ is computed for the reference receiver/satellite pairs $RR_i/SV_j$ in the current sample time period.

Figure 3:
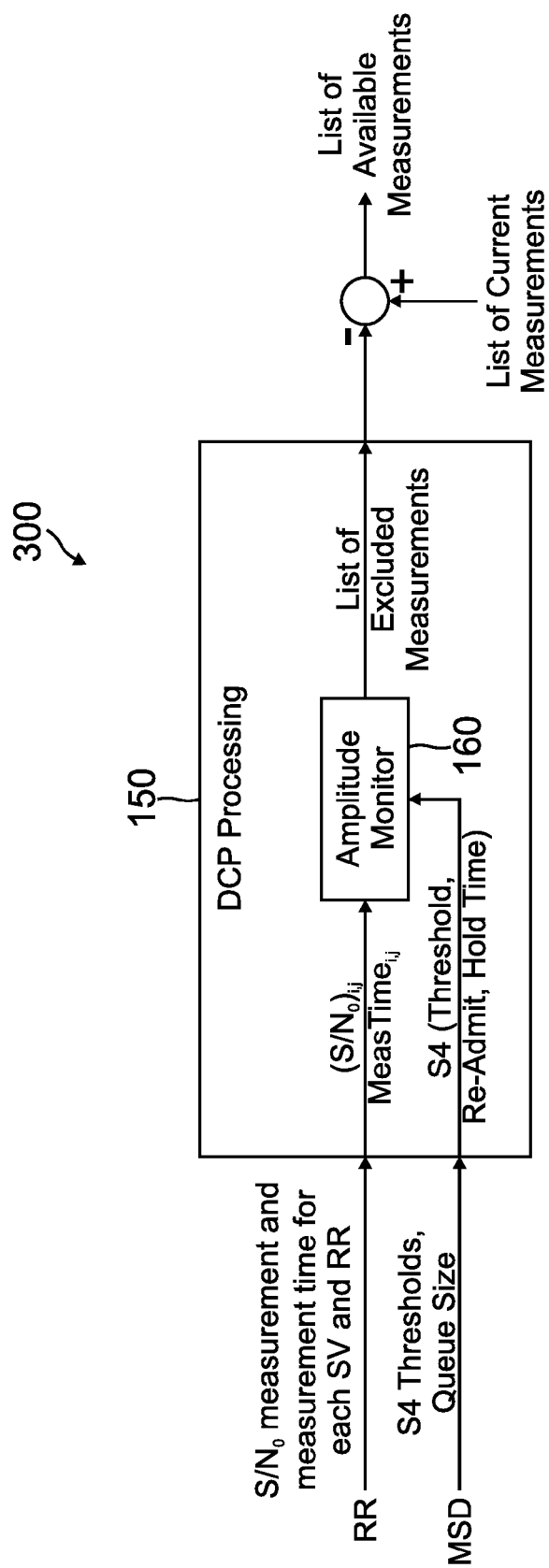
FIG. 3 shows a differential correction processor (DCP) processing diagram used to determine if satellite measurement data associated with an amplitude scintillation monitor discriminator measurement is to be excluded in accordance with the present application.

FIG. 3 shows a differential correction processor (DCP) processing diagram 150 used to determine if a satellite measurement of the associated amplitude scintillation monitor discriminator measurement is to be excluded in accordance with the present application. For each sample, the reference receivers 60(1-4) (FIG. 1) provides the SNR power level measurement to the processor 50 (FIG. 1) from the satellites (space vehicle (SV)) 20(1-N). The processor 50 also receives as inputs, the S4 exclusion threshold, the S4 re-admittance threshold, the hold times, and the queue sizes. In one implementation of this embodiment, this input data is stored in the memory 55 prior to being input to the processor 50. The S4 exclusion threshold is also referred to herein as "a measurement exclusion threshold", "an exclusion threshold" and "an SV measurement exclusion threshold" all of which are represented as S4_THRESHOLD. The S4 re-admittance threshold is also referred to herein as "a measurement re-admittance threshold", "a readmit threshold" and "an SV measurement re-admittance threshold" all of which are represented as S4_READMIT THRESHOLD.

During each sample time period, the processor 50 (FIG. 1) receives the input and executes the amplitude monitor software 160 to determine if the associated satellite measurement data is to be excluded. A reference receiver/satellite pair $RR_i/SV_j$ for which the amplitude scintillation monitor discriminator measurement for the associated satellite measurement data is to be excluded, is referred to herein as an excluded reference receiver/satellite pair $RR_i/$ $SV_j$ (or $RR_i/SV_{j\_excluded}$). As shown in FIG. 3, the amplitude monitor software 160 outputs the list of excluded satellite measurements, which are used to determine the available measurements. The available measurements are the current set of measurements less the list of excluded measurements output from the amplitude monitor software 160.

The flow of the execution of the amplitude monitor software 160 is shown as the methods 400 and 500 of FIGS. 4 and 5, respectively. FIG. 4 shows a flow diagram of a method 400 of excluding satellite measurement data associated with its amplitude scintillation monitor discriminator (S4) measurement in accordance with the present application. The method 400 is executed for each sample time period, k. In one implementation of this embodiment, the sample time period has a duration of ½ second, although other durations for the sample time period are possible.

At block 402, the process starts. At block 404, it is determined if the reference receiver/satellite pair $RR_i/SV_j$ in the current sample time period (i.e., $SV_{i,j}$) is currently excluded. If $SV_{i,j}$ is currently excluded, the satellite measurement data of satellite measurement j on reference receiver i in the current sample time period, $SV_{ij}(k)$ is currently excluded.

If $SV_{ij}(k)$ is currently excluded, then $SV_{ij}$ was excluded in a previous sample time period (e.g., during the $(k-1)^{th}$ sample time period through the $(k-n)^{th}$ sample time period, where "n" is a positive integer), the flow proceeds to block 406 and a readmit check is performed. In this case, the flow proceeds from block 406 to block 502 of method 500 in FIG. 5, which is described below.

If $SV_{ij}(k)$ is not currently excluded, the flow proceeds from block 404 to block 408. At block 408, it is determined if the amplitude scintillation monitor discriminator measurement $S4_{ij}(k)$ has met its exclusion criteria. This process is repeated for each of the reference receiver/satellite pairs $RR_i/SV_j$.

In one implementation of this embodiment, the exclusion criteria is met if $S4_{ij}(k)$ is greater than the exclusion threshold (e.g., the S4 threshold). In another implementation of this embodiment, the exclusion criteria is met if $S4_{ij}(k)$ is greater than or equal to the S4 threshold. The S4 threshold (exclusion threshold) is stored in memory 55 (FIG. 1) and/or the processor 50 (FIG. 1). In either case, the amplitude scintillation monitor discriminator measurements $S4_{ij}(k)$ for the respective reference receiver/satellite pairs $RR_i/SV_j$ are each compared to the exclusion threshold. Other exclusion criteria are possible.

If $S4_{ij}$ has met its exclusion criteria for one (or more) of the reference receiver/satellite pairs $RR_i/SV_j$, that one (or more) reference receiver/satellite pair $RR_i/SV_j$ is an excluded reference receiver/satellite pair $RR_i/SV_{j\_excluded}$. In one implementation of this embodiment, two or more of reference receiver/satellite pairs $RR_i/SV_j$, have an $S4_{ij}$ that is equal to or greater than the S4 threshold. In that case, those reference receiver/satellite pairs $RR_i/SV_j$ are defined to be excluded reference receiver/satellite pairs $RR_i/SV_{j\_excluded}$ and the data sent from the satellite in the excluded reference receiver/satellite pairs $RR_i/SV_{j\_excluded}$ is not used in the downstream monitors 70 and is not a part of the broadcast sent via wireless communication link 22-5 (FIG. 1). Then the flow proceeds to block 410 for the one or more excluded reference receiver/satellite pairs $RR_i/SV_{j\_excluded}$. At block 410, that one (or more) reference receiver/satellite pair $RR_i/SV_j$ is identified as an excluded reference receiver/satellite pair $RR_i/SV_{j\_excluded}$. In this manner, the data from the satellite in the reference receiver/satellite pair for an excluded reference receiver/satellite pair $RR_i/SV_{j\_excluded}$ is no longer used in the downstream monitors 70 and is not part of the broadcast sent via wireless communication link 22-5 (FIG. 1) when the amplitude scintillation monitor discriminator measurement for the excluded reference receiver/satellite pair $RR_i/SV_{j\_excluded}$ is determined (upon comparison with the exclusion threshold) to be equal to or greater than an exclusion threshold (i.e., S4_THRESHOLD). Then, the flow proceeds to block 412 and the flow exits the process for the current sample time period.

If $S4_{ij}$ has not met its exclusion criteria, the flow proceeds from block 408 to block 412 and the flow for that one (or more) non-excluded reference receiver/satellite pair $RR_i/SV_j$ exits the process for the current sample time period. In one implementation of this embodiment, if $S4_{ij}(k)$ is less than the S4 exclusion threshold for one (or more) of the reference receiver/satellite pairs $RR_i/SV_j$, then that one (or more) of the reference receiver/satellite pairs $RR_i/SV_j$ is not excluded and the satellite measurement data continues to be used in the downstream monitors 70 and remains a part of the broadcast sent via wireless communication link 22-5 (FIG. 1).

FIG. 5 shows a flow diagram of a method 500 of readmitting satellite measurement data associated with an amplitude scintillation monitor discriminator (S4) measurement in accordance with the present application. The satellite measurement data is readmitted when it is determined that the amplitude scintillation event has ended. The method 500 is implemented for each of the reference receiver/satellite pairs $RR_i/SV_j$ by processor 50 executing software 85 in the amplitude scintillation monitor 13 (FIG. 1).

At block 502, the process starts. At block 504, it is determined if $SV_{ij}(k)$ is currently excluded. If $SV_{ij}(k)$ is not currently excluded (e.g., if $SV_{ij}$ for the reference receiver/satellite pair $RR_i/SV_j$ is not excluded in the $k^{th}$ sample time period), the flow proceeds to block 506 and an exclusion check is performed. The current sample time period is the $k^{th}$ sample time period, as used herein. In this case, the flow proceeds from block 506 to block 402 of method 400 in FIG. 4, for processing as described above.

If $SV_{ij}(k)$ is currently excluded, the flow proceeds to block 508. At block 508, it is determined if $S4_{ij}(k)$ in the current sample time period for an excluded reference receiver/satellite pair $RR_i/SV_{j\_excluded}$ meets the readmittance criteria.

In one implementation of this embodiment, the readmittance criteria is satisfied when amplitude scintillation monitor discriminator $S4_{ij}(k)$ in the current sample time period is less than the S4 readmit threshold. The S4 readmit threshold is preselected and is stored in memory 55 (FIG. 1) or in the processor 50 (FIG. 1). The processor 50 compares the amplitude scintillation monitor discriminator $S4_{ij}(k)$ for the excluded reference receiver/satellite pair $RR_i/SV_{j\_excluded}$ to the S4 readmit threshold. Other readmittance criteria are possible.

In another implementation of this embodiment, the readmittance criteria is satisfied when $S4_{ij}(k)$ is less than the S4 readmit threshold in the current sample time period for a preselected number P (where P is a positive integer) of samples that occurred prior to the current sample time period and after the reference receiver/satellite pair $RR_i/SV_j$ was excluded. In this embodiment, the processor 50 compares the amplitude scintillation monitor discriminator $S4_{ij}(k)$ for the excluded reference receiver/satellite pair $RR_i/SV_{j\_excluded}$ to the S4 readmit threshold; counts the number of samples below the threshold since the reference receiver/satellite pair $RR_i/SV_j$ was excluded; and compares the counted number of samples below the threshold since the reference receiver/satellite pair $RR_i/SV_j$ was excluded to the stored preselected number P. The preselected number P is stored in memory 55 (FIG. 1) or in the processor 50 (FIG. 1).

In yet another implementation of this embodiment, the readmittance criteria is satisfied when $S4_{ij}(k)$ in the current sample time period is less than the S4 readmit threshold for a preselected number P of consecutive samples that occurred consecutively just prior to the current sample time period. In yet another implementation of this embodiment, the readmittance criteria is satisfied when a preselected number P of samples have been counted regardless of the value of $S4_{ij}(k)$ for those consecutive samples. These optional readmittance criteria are used as indications that the amplitude scintillation event has ended. Other readmittance criteria to indicate that the amplitude scintillation event has ended are possible.

If $S4_{ij}(k)$ meets the readmittance criteria for an excluded reference receiver/satellite pair $RR_i/SV_{j\_excluded}$, the flow proceeds to block 510. At block 510, the satellite measurement of the excluded reference receiver/satellite pair is no longer excluded. The flow proceeds from block 510 to block 512 and the flow exits the process (block 512) for the current sample time period.

If at block 508, it is determined that $S4_{ij}(k)$ does not meet the readmittance criteria for an excluded reference receiver/satellite pair $RR_i/SV_{j\_excluded}$, the satellite measurement of the excluded reference receiver/satellite pair $RR_i/SV_{j\_excluded}$ still is (remains) excluded. The flow proceeds to block 512. In this manner, measurement data obtained from a reference receiver/satellite pair $RR_i/SV_j$ during a scintillation event is excluded from use in a navigation system and measurement data from that excluded reference receiver/satellite pair $RR_i/SV_{j\_excluded}$ is readmitted after the scintillation event has ended for the excluded reference receiver/satellite pair $RR_i/SV_{j\_excluded}$.

In one implementation of this embodiment, the presence/non-presence of scintillation using SNR is determined from 4 reference receivers. In another implementation of this embodiment, the SNR used to detect amplitude scintillation is based on an S4 exclusion threshold of 0.6 (unitless) and a readmit threshold of 0.12 (unitless) for 10 consecutive samples.

The methods and techniques described here may be implemented in digital electronic circuitry, or with at least one processor (for example, a programmable processor, a special-purpose processor, a general-purpose processor such as a computer, or the processor 50 of FIG. 1) firmware, software, or in any combination of them. Apparatus embodying these techniques may include appropriate input and output devices, a processor, and a storage medium tangibly embodying program instructions for execution by the processor. A process embodying these techniques may be performed by at least one processor executing a program of instructions to perform desired functions by operating on input data and generating appropriate output. The techniques may advantageously be implemented in one or more programs that are executable on a programmable system including at least one processor coupled to receive data and instructions from, and to transmit data and instructions to, a data storage system, at least one input device, and at least one output device. Generally, a processor will receive instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a method of implementing a real-time screening process for amplitude scintillation, the method comprising: detecting an amplitude scintillation event during a sample time period at an amplitude scintillation monitor; excluding associated satellite measurement data from further use based on the detection of the amplitude scintillation event at the amplitude scintillation monitor; detecting an end to the amplitude scintillation event at the amplitude scintillation monitor; and readmitting associated satellite measurement data collected after the end of the amplitude scintillation event as determined by the amplitude scintillation monitor.

Example 2 includes the method of Example 1, wherein detecting the amplitude scintillation event during the sample time period at the amplitude scintillation monitor comprises: determining an amplitude scintillation monitor discriminator in a current sample time period for at least one reference receiver/satellite pair meets exclusion criteria.

Example 3 includes the method of Example 2, wherein determining the amplitude scintillation monitor discriminator in the current sample time period for at least one reference receiver/satellite pair meets the exclusion criteria comprises: determining the amplitude scintillation monitor discriminator in the current sample time period for the at least one reference receiver/satellite pair is one of: greater than an exclusion threshold; or equal to the exclusion threshold.

Example 4 includes the method of any of Examples 1-3, wherein detecting the end to the amplitude scintillation event comprises: determining an amplitude scintillation monitor discriminator in a current sample time period for an excluded reference receiver/satellite pair meets readmittance criteria.

Example 5 includes the method of Example 4, wherein determining the amplitude scintillation monitor discriminator in the current sample time period for the excluded reference receiver/satellite pair meets the readmittance criteria comprises: determining the amplitude scintillation monitor discriminator in the current sample time period for the excluded reference receiver/satellite pair is less than a readmit threshold.

Example 6 includes the method of any of Examples 4-5, wherein determining the amplitude scintillation monitor discriminator in the current sample time period for the excluded reference receiver/satellite pair meets the readmittance criteria comprises: determining the amplitude scintillation monitor discriminator in the current sample time period for the excluded reference receiver/satellite pair is less than a readmit threshold for a preselected number of samples.

Example 7 includes the method of any of Examples 4-6, wherein determining the amplitude scintillation monitor discriminator in the current sample time period for the excluded reference receiver/satellite pair meets the readmittance criteria comprises: determining the amplitude scintillation monitor discriminator in the current sample time period for the excluded reference receiver/satellite pair is less than a readmit threshold for a preselected number of consecutive samples.

Example 8 includes the method of any of Examples 1-7 further comprising: calculating a signal to noise power level in a current sample time period for reference receiver/satellite pairs; and computing an amplitude scintillation monitor discriminator in the current sample time period for the reference receiver/satellite pairs.

Example 9 includes a program product for implementing a real-time screening process for amplitude scintillation, the program product comprising a processor-readable medium on which program instructions are embodied, wherein the program instructions are operable, when executed by at least one processor in an amplitude scintillation monitor, to cause the amplitude scintillation monitor to: detect an amplitude scintillation event during a sample time period; exclude a satellites associated measurement data from further use based on the detection of the amplitude scintillation event; detect an end to the amplitude scintillation event; and readmit the satellites associated measurement data collected after the end of the amplitude scintillation event.

Example 10 includes the program product of Example 9, wherein the program instructions operable to detect the amplitude scintillation event during the sample time period, include program instructions operable, when executed by the at least one processor, to cause the amplitude scintillation monitor to: determine an amplitude scintillation monitor discriminator in a current sample time period for at least one reference receiver/satellite pair meets exclusion criteria.

Example 11 includes the program product of Example 10, wherein the program instructions operable to determine the amplitude scintillation monitor discriminator in the current sample time period for the at least one reference receiver/satellite pair meets the exclusion criteria include program instructions operable, when executed by the at least one processor, to cause the amplitude scintillation monitor to: determine the amplitude scintillation monitor discriminator in the current sample time period for the at least one reference receiver/satellite pair is one of: greater than an exclusion threshold; or equal to the exclusion threshold.

Example 12 includes the program product of any of Examples 9-11, wherein the program instructions operable to detect the end to the amplitude scintillation event include program instructions operable, when executed by the at least one processor, to cause the amplitude scintillation monitor to: determine an amplitude scintillation monitor discriminator in a current sample time period for an excluded reference receiver/satellite pair meets readmittance criteria.

Example 13 includes the program product of Example 12, wherein the program instructions operable to determine the amplitude scintillation monitor discriminator in the current sample time period for the excluded reference receiver/satellite pair meets the readmittance criteria include program instructions operable, when executed by the at least one processor, to cause the amplitude scintillation monitor to: determine the amplitude scintillation monitor discriminator in the current sample time period for the excluded reference receiver/satellite pair is less than a readmit threshold.

Example 14 includes the program product of any of Examples 12-13, wherein the program instructions operable to determine the amplitude scintillation monitor discriminator in the current sample time period for the excluded reference receiver/satellite pair meets the readmittance criteria include program instructions operable, when executed by the at least one processor, to cause the amplitude scintillation monitor to: determine the amplitude scintillation monitor discriminator in the current sample time period for the excluded reference receiver/satellite pair is less than a readmit threshold for a preselected number of samples.

Example 15 includes the program product of any of Examples 12-14, wherein the program instructions operable to determine the amplitude scintillation monitor discriminator in the current sample time period for the excluded reference receiver/satellite pair meets the readmittance criteria include program instructions operable, when executed by the at least one processor, to cause the amplitude scintillation monitor to: determine the amplitude scintillation monitor discriminator in the current sample time period for the excluded reference receiver/satellite pair is less than a readmit threshold for a preselected number of consecutive samples.

Example 16 includes an amplitude scintillation monitor to provide real-time screening for amplitude scintillation, the amplitude scintillation monitor comprising: at least one processor communicatively coupled to receive input from a plurality of reference receivers; and a storage medium tangibly embodying program instructions for execution by the at least one processor, wherein the program instructions are operable, when executed by the at least one processor, to: detect an amplitude scintillation event during a sample time period; exclude the associated satellite measurement data from further use based on the detection of the amplitude scintillation event; detect an end to the amplitude scintillation event; and readmit associated satellite measurement data collected after the end of the amplitude scintillation event.

Example 17 includes the amplitude scintillation monitor of Example 16, wherein the program instructions to detect the amplitude scintillation event during the sample measurement are further operable, when executed by the at least one processor, to: determine an amplitude scintillation monitor discriminator in a current sample time period for at least one reference receiver/satellite pair meets exclusion criteria.

Example 18 includes the amplitude scintillation monitor of Example 17, wherein the program instructions operable to determine the amplitude scintillation monitor discriminator in the current sample time period for the at least one reference receiver/satellite pair meets the exclusion criteria include program instructions operable, when executed by the at least one processor, to: determine the amplitude scintillation monitor discriminator in a current sample time period for the at least one reference receiver/satellite pair is one of: greater than an exclusion threshold; or equal to the exclusion threshold.

Example 19 includes the amplitude scintillation monitor of any of Examples 16-18, wherein the program instructions operable to detect the end to the amplitude scintillation event include program instructions operable, when executed by the at least one processor, to: determine an amplitude scintillation monitor discriminator in the current sample time period for an excluded reference receiver/satellite pair meets readmittance criteria.

Example 20 includes the amplitude scintillation monitor of Example 19, wherein the program instructions operable to determine the amplitude scintillation monitor discriminator in the current sample time period for the excluded reference receiver/satellite pair meets the readmittance criteria include program instructions operable, when executed by the at least one processor, to: determine the amplitude scintillation monitor discriminator in the current sample time period for the excluded reference receiver/satellite pair is less than a readmit threshold.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of implementing a real-time screening process for amplitude scintillation, the method comprising:
   computing an amplitude scintillation monitor discriminator in a current sample time period for at least one reference receiver/satellite pair based at least in part on signal to noise power levels;
   detecting an amplitude scintillation event at an amplitude scintillation monitor based at least in part on the computed amplitude monitor discriminator in the current sample time period;
   excluding associated satellite measurement data from further use based on the detection of the amplitude scintillation event at the amplitude scintillation monitor;
   detecting an end to the amplitude scintillation event at the amplitude scintillation monitor based at least in part on the computed amplitude monitor discriminator in the current sample time period; and
   readmitting associated satellite measurement data collected after the end of the amplitude scintillation event as determined by the amplitude scintillation monitor.

2. The method of claim 1, wherein detecting the amplitude scintillation event at the amplitude scintillation monitor comprises:
   determining the amplitude scintillation monitor discriminator in the current sample time period for the at least one reference receiver/satellite pair meets exclusion criteria.

3. The method of claim 2, wherein determining the amplitude scintillation monitor discriminator in the current sample time period for the at least one reference receiver/satellite pair meets the exclusion criteria comprises:
   determining the amplitude scintillation monitor discriminator in the current sample time period for the at least one reference receiver/satellite pair is one of: greater than an exclusion threshold; or equal to the exclusion threshold.

4. The method of claim 1, wherein detecting the end to the amplitude scintillation event comprises:
   determining the amplitude scintillation monitor discriminator in the current sample time period for an excluded reference receiver/satellite pair meets readmittance criteria.

5. The method of claim 4, wherein determining the amplitude scintillation monitor discriminator in the current sample time period for the excluded reference receiver/satellite pair meets the readmittance criteria comprises:
   determining the amplitude scintillation monitor discriminator in the current sample time period for the excluded reference receiver/satellite pair is less than a readmit threshold.

6. The method of claim 4, wherein determining the amplitude scintillation monitor discriminator in the current sample time period for the excluded reference receiver/satellite pair meets the readmittance criteria comprises:
   determining the amplitude scintillation monitor discriminator in the current sample time period for the excluded reference receiver/satellite pair is less than a readmit threshold for a preselected number of samples.

7. The method of claim 4, wherein determining the amplitude scintillation monitor discriminator in the current sample time period for the excluded reference receiver/satellite pair meets the readmittance criteria comprises:
   determining the amplitude scintillation monitor discriminator in the current sample time period for the excluded reference receiver/satellite pair is less than a readmit threshold for a preselected number of consecutive samples.

8. The method of claim 1 further comprising:
   calculating the signal to noise power levels for the reference receiver/satellite pair.

9. A program product for implementing a real-time screening process for amplitude scintillation, the program product comprising a processor-readable medium on which program instructions are embodied, wherein the program instructions are operable, when executed by at least one processor in an amplitude scintillation monitor, to cause the amplitude scintillation monitor to:
   compute an amplitude scintillation monitor discriminator in a sample time period for the at least one reference receiver/satellite pairs based at least in part on the signal to noise power levels;
   detect an amplitude scintillation event based on the computed amplitude scintillation monitor discriminator in the sample time period;
   exclude associated satellite measurement data from further use based on the detection of the amplitude scintillation event;
   detect an end to the amplitude scintillation event based on the computed amplitude scintillation monitor discriminator in the current sample time period; and
   readmit associated satellite measurement data collected after the end of the amplitude scintillation event.

10. The program product of claim 9, wherein the program instructions operable to detect the amplitude scintillation event during in the sample time period, include program instructions operable, when executed by the at least one processor, to cause the amplitude scintillation monitor to:
    determine the amplitude scintillation monitor discriminator in a current sample time period for at least one reference receiver/satellite pair meets exclusion criteria.

11. The program product of claim 10, wherein the program instructions operable to determine the amplitude scintillation monitor discriminator in the current sample time period for the at least one reference receiver/satellite pair meets the exclusion criteria include program instructions operable, when executed by the at least one processor, to cause the amplitude scintillation monitor to:
    determine the amplitude scintillation monitor discriminator in the current sample time period for the at least one reference receiver/satellite pair is one of: greater than an exclusion threshold; or equal to the exclusion threshold.

12. The program product of claim 9, wherein the program instructions operable to detect the end to the amplitude scintillation event include program instructions operable, when executed by the at least one processor, to cause the amplitude scintillation monitor to:
    determine the amplitude scintillation monitor discriminator in a current sample time period for an excluded reference receiver/satellite pair meets readmittance criteria.

13. The program product of claim 12, wherein the program instructions operable to determine the amplitude scintillation monitor discriminator in the current sample time period for the excluded reference receiver/satellite pair meets the readmittance criteria include program instructions operable, when executed by the at least one processor, to cause the amplitude scintillation monitor to:

determine the amplitude scintillation monitor discriminator in the current sample time period for the excluded reference receiver/satellite pair is less than a readmit threshold.

14. The program product of claim 12, wherein the program instructions operable to determine the amplitude scintillation monitor discriminator in the current sample time period for the excluded reference receiver/satellite pair meets the readmittance criteria include program instructions operable, when executed by the at least one processor, to cause the amplitude scintillation monitor to:

determine the amplitude scintillation monitor discriminator in the current sample time period for the excluded reference receiver/satellite pair is less than a readmit threshold for a preselected number of samples.

15. The program product of claim 12, wherein the program instructions operable to determine the amplitude scintillation monitor discriminator in the current sample time period for the excluded reference receiver/satellite pair meets the readmittance criteria include program instructions operable, when executed by the at least one processor, to cause the amplitude scintillation monitor to:

determine the amplitude scintillation monitor discriminator in the current sample time period for the excluded reference receiver/satellite pair is less than a readmit threshold for a preselected number of consecutive samples.

16. An amplitude scintillation monitor to provide real-time screening for amplitude scintillation, the amplitude scintillation monitor comprising:

at least one processor communicatively coupled to receive input from a plurality of reference receivers; and a storage medium tangibly embodying program instructions for execution by the at least one processor, wherein the program instructions are operable, when executed by the at least one processor, to:

compute an amplitude scintillation monitor discriminator in a sample time period for the at least one reference receiver/satellite pairs based at least in part on signal to noise power levels;

detect an amplitude scintillation event based at least in part on the computed amplitude scintillation monitor discriminator in the sample time period;

exclude associated satellite measurement data from further use based on the detection of the amplitude scintillation event;

detect an end to the amplitude scintillation event based at least in part on the computed amplitude scintillation monitor discriminator; and readmit associated satellite measurement data collected after the end of the amplitude scintillation event.

17. The amplitude scintillation monitor of claim 16, wherein the program instructions to detect the amplitude scintillation event are further operable, when executed by the at least one processor, to:

determine the amplitude scintillation monitor discriminator in the current sample time period for at least one reference receiver/satellite pair meets exclusion criteria.

18. The amplitude scintillation monitor of claim 17, wherein the program instructions operable to determine the amplitude scintillation monitor discriminator for the at least one reference receiver/satellite pair meets the exclusion criteria include program instructions operable, when executed by the at least one processor, to:

determine the amplitude scintillation monitor discriminator in the current sample time period for the at least one reference receiver/satellite pair is one of: greater than an exclusion threshold; or equal to the exclusion threshold.

19. The amplitude scintillation monitor of claim 16, wherein the program instructions operable to detect the end to the amplitude scintillation event include program instructions operable, when executed by the at least one processor, to:

determine the amplitude scintillation monitor discriminator in the current sample time period for an excluded reference receiver/satellite pair meets readmittance criteria.

20. The amplitude scintillation monitor of claim 19, wherein the program instructions operable to determine the amplitude scintillation monitor discriminator in the current sample time period for the excluded reference receiver/satellite pair meets the readmittance criteria include program instructions operable, when executed by the at least one processor, to:

determine the amplitude scintillation monitor discriminator in the current sample time period for the excluded reference receiver/satellite pair is less than a readmit threshold.

* * * * *